United States Patent [19]

Takahashi et al.

[11] Patent Number: 4,927,166

[45] Date of Patent: May 22, 1990

[54] REAR WHEEL STEERING DEVICE FOR AUTOMOTIVE VEHICLES

[75] Inventors: Akira Takahashi; Yuji Soejima, both of Tokyo, Japan

[73] Assignee: Fuji Jukogyo Kabushiki Kaisha, Tokyo, Japan

[21] Appl. No.: 312,039

[22] Filed: Feb. 17, 1989

[30] Foreign Application Priority Data

Feb. 25, 1988 [JP] Japan .................................. 63-24432

[51] Int. Cl.$^5$ ............................................. B62D 5/10
[52] U.S. Cl. ...................................................... 280/91
[58] Field of Search .................... 280/91, 707, 99, 100, 280/101; 180/234, 140

[56] References Cited

U.S. PATENT DOCUMENTS 4,660,844 4/1987 Yamamoto et al. .................. 280/91
4,703,945 11/1987 Kamamoto et al. .................. 280/91

Primary Examiner—Richard A. Bertsch
Attorney, Agent, or Firm—Beveridge, De Grandi & Weilacher

[57] ABSTRACT

A rear wheel steering device for automotive vehicles, of the type in which a double-link type of rear suspension having the rear wheels supported by the front and rear suspension arms so as to be movable in an upward and a downward directions. The rear wheel steering device includes supporting pins supporting the base end portions of at least one of the front and the rear pairs of arms to the suspension cross member of the automobile body and supporting shafts supporting the other pair of arms to the automobile body, with one of the end portions of the supporting shafts being rotatably mounted to the suspension cross member. The other end portions of the supporting shafts have eccentric shaft portions connected by a connecting rod so that the position of the eccentric shaft portions changes substantially in a range of 0°-180°. The pair of left and right eccentric shaft portions are inserted in sliding bushes comprising an elastic circular ring and an inner cylinder rotatably supporting the base end portions of either pair of said rear arms. The device also includes an actuator to rotate the supporting shafts in accordance with automobile speed, front wheel turning angle and front wheel steering force.

6 Claims, 3 Drawing Sheets

REAR WHEEL STEERING DEVICE FOR AUTOMOTIVE VEHICLES

BACKGROUND OF THE INVENTION

The present invention relates to a rear wheel steering device.

There have been devised and demonstrated various types of steering systems which can turn the rear wheels in combination with the turning of the front wheels as disclosed in Japanese Utility Model Laid-Open Publication No. 60-66581.

In the case of the steering systems of the type which turn the rear wheels in combination with the front wheels, most of the rear wheel steering devices are such that a gear train or mechanism of as the rack-pinion type is utilized same as the front wheel steering device, so that the gear train or mechanism is operated in combination with the steering operation of the front wheel steering device, whereby the rear wheels rotate about their corresponding king pins.

However, the conventional rear wheel steering devices of the type described above have the drawbacks that the device has a complex construction; the production cost is great; and a considerably large space is required for the installation of the rear wheel steering device.

Furthermore, the turning angle of the rear wheels is extremely smaller than that of the front wheels. When the rear wheel, steering operation is carried out by the gear train or mechanism of the type described above or a linkage, backlash between the engaging gears or play of the linkage adversely affects the control of the steering of the rear wheels. Therefore there arise the drawbacks that the gears and links must be manufactured with a high degree of accuracy; that backlash and play must be reduced to a minimum; and that productivity is considerably low.

In the case of directly steering the rear wheels by means of hydraulic actuator, an electric motor or the like, it becomes very difficult to correctly control a very small turning angle of the rear wheels by the actuator itself. Furthermore, there exists the drawback that it is very difficult to maintain the turning angle of the rear wheels by the actuator alone.

SUMMARY OF THE INVENTION

In view of the above, the primary object of the present invention is to provide a rear wheel steering device which can substantially overcome the drawbacks encountered in the conventional rear wheel steering devices.

To overcome the above and other drawbacks, in a double-link type rear suspension of the type in which the rear wheels are vertically and movably supported by a front arm and a rear arm, the present invention is characterized by comprising the front arm and rear arm which are connected to each other in such a way that one of the front and rear arms has a base end portion rotatably supported by an automotive body, a shaft which supports the other arm on the automotive body and one end of the arm is rotatably mounted on said automotive body and the other end of the arm has a fitting portion comprising an eccentric shaft portion so that the right and left fitting portions have eccentric shaft which change substantially in a range of 0°–180°, sliding bushes comprising an inner cylinder and an elastic ring and being rotatably fitted over the base end portion of said other arm at each of the right and left fitting portions, and an actuator responsive to the wheel speed and the turning angle of the front wheel or to the steering force of the front wheel to rotate said shaft.

The sliding bush comprising an inner cylinder and an elastic circular ring is fitted over the eccentric shaft portion of the shaft which supports the other arm on the automotive body so that the angle of rotation of the actuator with respect to the turning angle of the rear wheels can be increased. As a result, a very small turning angle of the rear wheels can be correctly controlled.

DESCRIPTION OF THE PREFERRED EMBODIMENT

With reference to the accompanying drawings, a preferred embodiment of the present invention will be described in more detail hereinafter.

Figure 1:
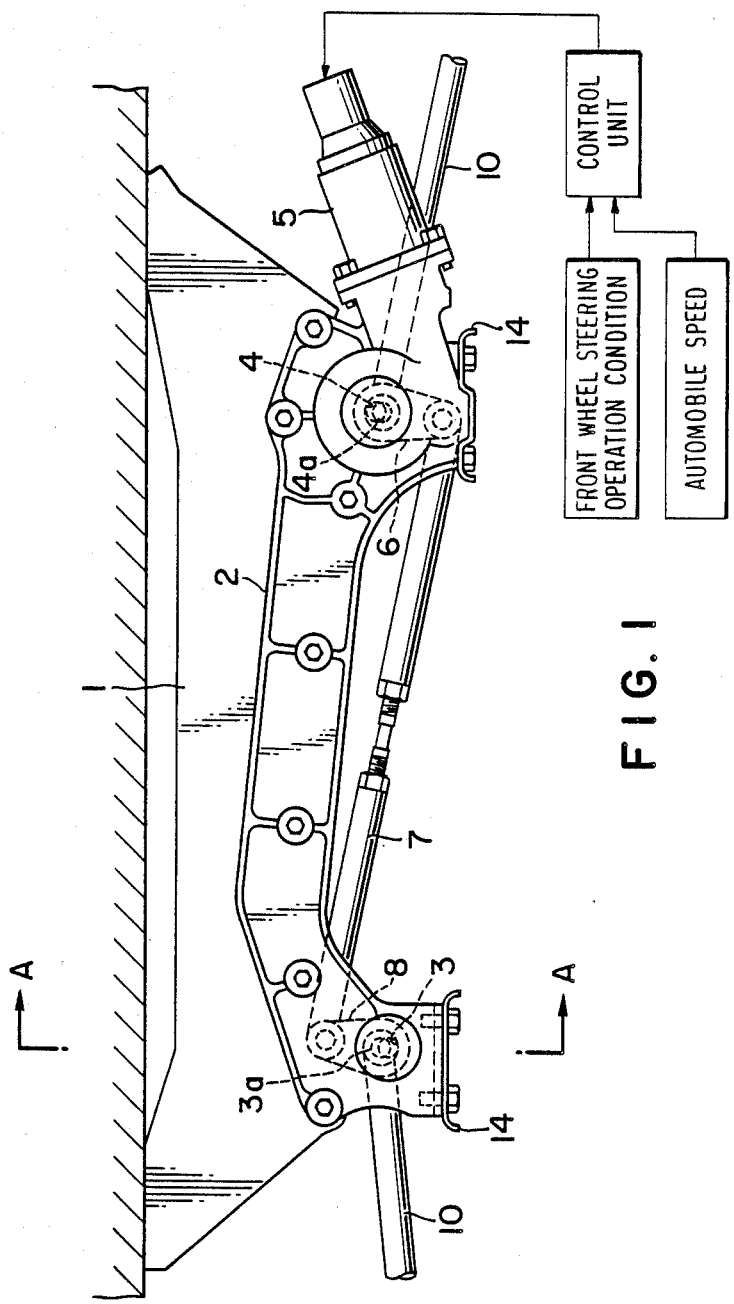
FIG. 1 is a front view of a preferred embodiment of the present invention viewed from the rear side.
Figure 2:
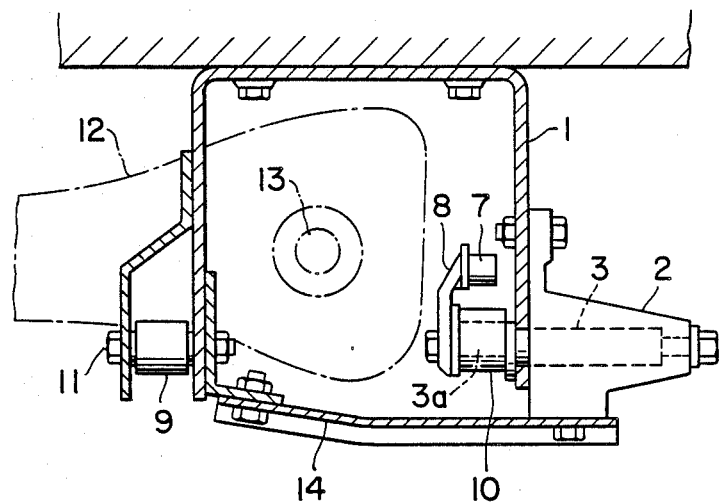
FIG. 2 is a sectional view taken along the line A—A of FIG. 1.

First referring to FIGS. 1 and 2, a rear suspension arm is mounted on and supported by a suspension cross member 1. A rear wheel steering device case 2 is attached to the rear surface portion of the suspension cross member by bolts and nuts.

Supporting shafts 3 and 4 are rotatably supported at the left and right ends respectively of the case 2. An electric motor 5 is mounted on the case 2 in the vicinity of the supporting shaft 4. The supporting shaft 4 is rotated by the motor through a worm gear 17 and a worm 16 (shown in FIG. 5). The rotation of the supporting shaft 4 is transmitted through a lever 6, a connecting rod 7 and a lever 8 to the supporting shaft 3 so that both the supporting shafts 3 and 4 are rotated together.

The front end portions of the supporting shafts 3 and 4 have eccentric shaft portions 3a and 4a, respectively, which are extended through a rear surface wall of the suspension cross member 1 inwardly. The rear wheel steering device case 2 is mounted on the suspension cross member 1 and the end side of the center of the automotive body are rotatably attached to the eccentric shaft portions 3a and 4a, respectively.

The end side of left and right front suspension arms 9 against the center of the automotive body is rotatably supported by a front supporting pin 11 on the front surface portion of the suspension cross member 1.

The end side of the front and rear suspension arms 9 and 10 against the automotive body is rotatably mounted at the front and rear sides of the rear wheel supporting member which rotatably support the rear wheel shaft. A bush made of an elastic material such as rubber is fitted over the rotating portions at both ends of the front and rear suspension arms 9 and 10.

The rear portion of a differential device 12 is supported at the center portion of the suspension cross member 1. Left and right drive shafts 13 for transmitting driving forces to the left and right rear wheels from the differential device 12 are extended through the suspension cross member 1.

Front end portions of under-guards 14 are securely attached to the front surface wall of the suspension cross member 1. Rear end portions of the under-guards 14 are securely attached to the under surface of the rear wheel steering device case 2. The under-guards 14 cover the lower sides of the main component of the rear wheel steering mechanism such as the supporting shafts 3 and 4, the levers 6 and 8, the connecting rod 7 connecting levers 6 and 8 and others.

In response to the front wheel steering operation, a control unit generates an output to rotate the motor 5 in the clockwise or counterclockwise direction. When the motor 5 rotates in one direction so that the rear supporting shaft 4 rotates, the eccentric shaft portion 4a is rotated while being shifted to the right or left, and lever 6 also rotates in combination with the eccentric shaft portion 4a. The rotation of the lever 6 is transmitted through the connecting rod 7 to the lever 8, whereby the lever 8 also rotates. As a result, the rear supporting shaft 3 rotates in the same direction while the eccentric shaft portion 3a is shifted to the right or left.

Figure 3:
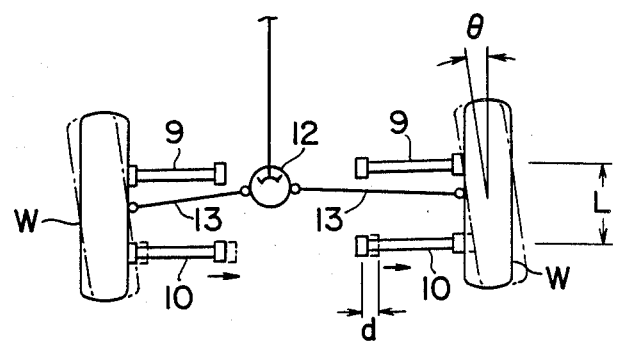
FIG. 3 is a top view to explain the mode of operation of the rear wheel steering device shown in FIGS. 1 and 2.

Then, as the rear wheels W are vertically movably supported by the front and rear suspension arms shown in FIG. 3, the center of the swinging motion of the rear suspension arm 10, that is, the centers of the eccentric shaft portions 3a and 4a are shifted to the right or left direction as described above. But the center of the swinging motion of the front suspension arm 9 does not move, so that the right and left rear wheels W are turned to the left or right direction.

With the above-described rear wheel steering mechanism, turning angle $\theta$ of the rear wheels is determined by the distance L between the points at which the front and rear arms 10 are attached to the rear wheel W and by the displacement d of the rear arm 10 in the right or left direction. That is, the turning angle $\theta$ is expressed by $$\theta = d/L.$$

For instance, when d=6 mm and L=180 mm, $\theta$ becomes approximately 2 degrees. The displacement d can be optionally controlled between 0-6 mm by the angle of rotation of the supporting shafts 3 and 4 so that the turning angle $\theta$ of the rear wheels W can be controlled substantially within a range of less than 2°.

In order to correctly control a very small turning angle of the rear wheels W, eccentricity of the eccentric shaft portions 3a and 4a of the supporting shafts 3 and 4 must be so selected as to be substantially equal to the displacement d of the rear wheel arm 10 in the right or left direction, and also, the angle of rotation of the supporting shafts 3 and 4 in response to the rotation of the motor 5 must be so selected as to be substantially 90°. Therefore, the conventional elastic materials utilizing the shear deformations cannot be used for the bushes inserted between the eccentric shaft portions 3a and 4a of the supporting shafts 3 and 4 and between the rotating portions at the ends of the suspension arms 9 and 10.

In view of the above, according to the present invention, as each of the bushes fitted over the eccentric shaft portions 3a and 4a of the supporting shafts 3 and 4 is a sliding bush comprising an inner cylinder 15a and an elastic circular ring 15b, the angle of rotation of the motor 5 with respect to the turning angle of the rear wheels W can be increased and a very small turning angle of the rear wheels W can be correctly controlled.

Figure 4:
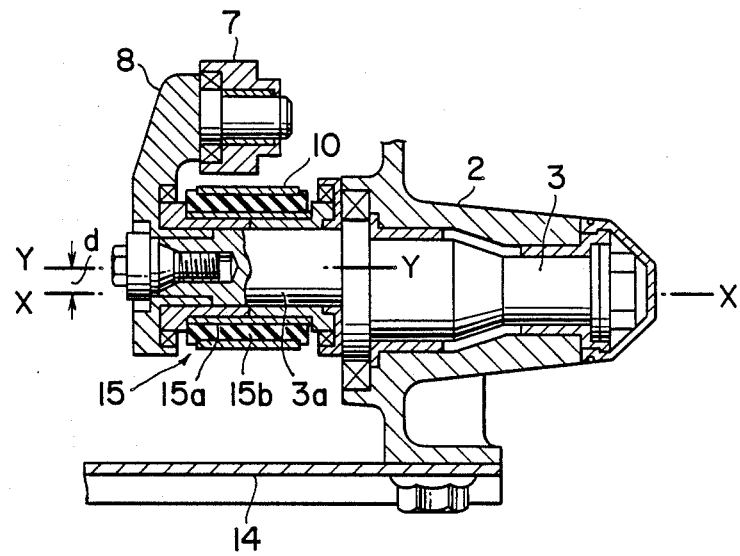
FIGS. 4 and 5 are longitudinal sectional views illustrating the right and left rear suspension arms mounted on the rear wheel steering device.
Figure 5:
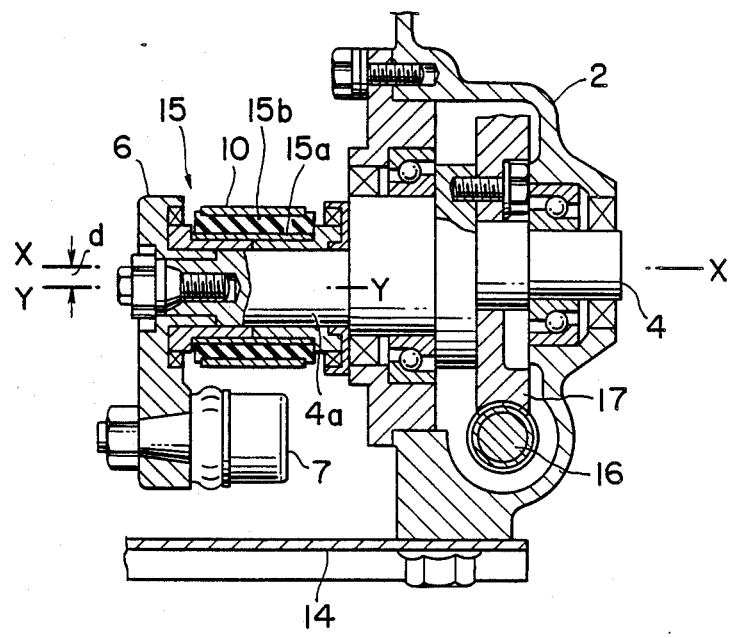

FIGS. 4 and 5 illustrate in detail the construction of the bearing portion of the rear wheel steering device case 2 for bearing or supporting the base end of the rear arm 10. That is, the eccentric shaft portions 3a and 4a which are eccentric with the eccentricity d with respect to an X—X of the supporting shafts 3 and 4 are formed at the of the supporting shafts 3 and 4. Cylindrical sliding bushes each consisting of the inner cylinder 15a and the elastic circular ring 15b are inserted in the bearings over cylindrical outer surfaces of the eccentric shaft portions 3a and 4a. The base end portion of the suspension arm 10 is fitted over the cylindrical outer surface of the sliding bush 15 (that is, the cylindrical periphery of the elastic circular ring 15b). Furthermore, the levers 6 and 8 are secured by screws to the ends of the eccentric shaft portions 3a and 4a.

As an alternative, the combination of the motor and the reduction gear, a hydraulic device, a vacuum actuator or the like can be used as an actuator.

So far it has been described that the center of the swinging motion of each of the right and left rear suspension arms can be changed, but it is apparent that the center of the swinging motion of each of the right and left front suspension arms 9 can be varied.

As described above, according to the present invention, in the double arm type rear suspension of the type in which the vertical movement of the rear wheels is allowed by the front and rear arms, the steering of the rear wheels can be correctly accomplished by a simple construction in which one of the front and rear arms causes the shaft supported by the automotive body to rotate so that the rear wheel steering device can be made compact in size; production cost can be considerably reduced; and an extremely small angle of turning the rear wheels can be controlled with a high degree of accuracy.

What is claimed is:

1. A rear wheel steering device for automotive vehicles, of the type in which a double-link type of a rear suspension having rear wheels, and a front and a rear pair of suspension arms against an automotive body respectively so as to rotatably support the rear wheels:

supporting pins supporting base end portions of at least one of the front and the rear pairs of suspension arms to be suspension cross member of the automobile body;

supporting shafts supporting the other pair of suspension arms to the automobile body, with one of the end portions of said supporting shafts being rotatably mounted to said suspension cross member, and with t he other end portions of said supporting shafts having eccentric shaft portions interconnected by a connecting rod;

said eccentric shaft portions being fitted with sliding bushes comprising an elastic circular ring and an inner cylinder rotatably supporting base end portions of the other pair of suspension arms; and an actuator to rotate one of said supporting shafts, so that the other supporting shafts is rotated in the same direction by the connecting rod.

2. A rear wheel steering device according to claim 1, said actuator is mounted in the vicinity of one of the other pair of suspension arms.

3. A rear wheel steering device according to claim 1, said actuator is an electric motor.

4. A rear wheel steering device according to claim 3, further comprises:
   a worm connected to an output shaft of the electric motor; and
   a worm gear fixedly connected to one of the supporting shafts for toothed engagement with the worm to transmit rotational force from the electric motor to the supporting shafts.

5. A rear wheel steering device according to claim 1, wherein said base end portions of the other pair of suspension arms are fitted over cylindrical outer surface of the sliding bushes.

6. A rear wheel steering device for an automotive vehicle having a vehicle body and front and rear wheels, the device having a pair of front suspension arms respectively connected to the front side portions of the corresponding rear wheels, a pair of rear suspension arms respectively connected to the rear side portions of the corresponding rear wheels, and an actuator to actuate the suspension arms in response to a control signal from a control unit, the device comprising:
   a suspension cross member fixed to the vehicle body;
   a pair of pins provided to rotatably support corresponding base end portions of one of the front and rear suspension arms;
   a pair of supporting shafts rotatably mounted to the suspension cross member and having eccentric shaft portions respectively;
   the eccentric shaft portions provided to rotatably support corresponding base end portions of the other of the front and rear suspension arms;
   connecting means provided to interconnect both the eccentric shaft portions for transmitting the rotation of one of the eccentric shaft portions to the others; and
   the actuator provided to rotate one of the supporting shaft for actuating the suspension arms through the eccentric shaft portions and the connecting means, so as to increase a rotation angle of the actuator with respect to the turning angle of the rear wheels according to providing the supporting shaft including the eccentric shaft portions so that control of the rear wheel steering device is correctly performed.

* * * * *